United States Patent
Aghili et al.

(10) Patent No.: US 9,942,007 B2
(45) Date of Patent: Apr. 10, 2018

(54) METHOD AND APPARATUS FOR TIME-BASED FAST ACK/NACK RESPONSE OPERATION WITH ENHANCED GENERAL PACKET RADIO SERVICE 2 UPLINK

(75) Inventors: Behrouz Aghili, Melville, NY (US); Marian Rudolf, Montreal (CA); Stephen G. Dick, Nesconset, NY (US); Prabhakar R. Chitrapu, Blue Bell, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 1558 days.

(21) Appl. No.: 12/241,256

(22) Filed: Sep. 30, 2008

(65) Prior Publication Data
US 2009/0086685 A1 Apr. 2, 2009

Related U.S. Application Data

(60) Provisional application No. 60/976,701, filed on Oct. 1, 2007.

(51) Int. Cl.
*H04J 3/00* (2006.01)
*H04L 1/16* (2006.01)

(52) U.S. Cl.
CPC .......... *H04L 1/1685* (2013.01); *H04L 1/1664* (2013.01)

(58) Field of Classification Search
USPC ........................................................ 370/336
See application file for complete search history.

(56) References Cited

U.S. PATENT DOCUMENTS 6,915,473 B2 * 7/2005 Bolourchi ............. H03M 13/09
714/755
7,249,182 B1 * 7/2007 Heinonen ............... H04L 29/06
709/227
(Continued)

FOREIGN PATENT DOCUMENTS

EP 1 255 368 11/2002
EP 1 608 194 12/2005
(Continued)

OTHER PUBLICATIONS

Third Generation Partnership Project, "Technical Specification Group SGM/EDGE Radio Access Network; General Packet Radio Service (GPRS); Mobile Station (MS)—Base Station System (BSS) interface; Radio Link Control/Medium Access Control (RLC/MAC) protocol (Release 7 )" 3GPP TS 44.060 V7.10.0.*

(Continued)

*Primary Examiner* — Gregory Sefcheck
*Assistant Examiner* — Majid Esmaeilian
(74) *Attorney, Agent, or Firm* — Volpe and Koenig, P.C.

(57) ABSTRACT

A method and apparatus for time-based fast positive acknowledgement (ACK)/negative acknowledgement (NACK) reporting (FANR) operation with enhanced general packet radio service 2 uplink (HUGE) are disclosed. A wireless transmit/receive unit (WTRU) configures downlink FANR operation and EGPRS-2 mode uplink transmission not to be in conflict. A modulation and coding scheme (MCS) for the EGPRS-2 mode may be limited to an MCS containing at most two RLC data blocks. Alternatively, three or more piggybacked ACK/NACK (PAN) bits may be used for a time-based FANR operation if an EGPRS-2 mode is configured. Alternatively, at least one PAN bit may indicate an ACK/NACK for a group of RLC data blocks. The number of PAN bits for a time-based FANR operation may be configured by the network. The downlink FANR operation (Continued)

may be dynamically switched between time-based and SSN-based.

10 Claims, 2 Drawing Sheets

(56) References Cited

U.S. PATENT DOCUMENTS

| | | | | |
|---|---|---|---|---|
| 7,254,381 | B1* | 8/2007 | Beamish | H04L 1/0025 455/334 |
| 7,428,409 | B2* | 9/2008 | Shinozaki | H04W 92/14 455/403 |
| 7,693,126 | B2* | 4/2010 | Cayla | H04L 1/1685 370/235 |
| 7,848,279 | B2* | 12/2010 | Ranta-aho | H04W 72/048 370/312 |
| 2002/0025812 | A1 | 2/2002 | Ahlstrand et al. | |
| 2007/0223404 | A1* | 9/2007 | Khan | H04L 1/1819 370/278 |
| 2008/0056303 | A1* | 3/2008 | Sebire et al. | 370/474 |
| 2008/0311918 | A1* | 12/2008 | Spencer | 455/446 |
| 2009/0092103 | A1* | 4/2009 | Rao | 370/336 |
| 2010/0011273 | A1* | 1/2010 | Parolari | 714/749 |

FOREIGN PATENT DOCUMENTS

| | | |
|---|---|---|
| EP | 1 780 926 | 5/2007 |
| WO | 04102980 A2 | 11/2004 |
| WO | 2007112698 A1 | 10/2007 |

OTHER PUBLICATIONS

Nokia Siemens Networks et al., "VoIP Over GERAN and FANR in the DL", 3GPP TSG-GERAN WG #35, Tdoc GP-071284, (Dublin, Ireland, Aug. 27-31, 2007).
Third Generation Partnership Project, "Technical Specification Group SGM/EDGE Radio Access Network; General Packet Radio Service (GPRS); Mobile Station (MS)—Base Station System (BSS) interface; Radio Link Control/Medium Access Control (RLC/MAC) protocol (Release 7)," 3GPP TS 44.060, V7.10.0, (Sep. 2009).
Ericsson, "GERAN evolution—Proposed text on improved Ack/Nack reporting for the chapter on latency requirements," 3GPP TSG GERAN #26, GP-052045 (Aug. 29-Sep. 2, 2005).
Nokia Corporation et al., "Introduction of time-based DL FANR," Change Request, 44.060, CR 0934, rev 2, Current Version 7.9.0, 3GPP TSG-GERAN Meeting #35, GP-071285 (Aug. 27-31, 2007).
Nokia Corporation et al., "Introduction of Time-Based DL FANR", Change Request, 44.060, CR 0934, rev 4, Current Version 7.9.0, 3GPP TSG-GERAN Meeting #35, GP-071511, (Dublin, Ireland, Aug. 27-31, 2007).
Nokia Siemens Networks et al., "MCS Design for Red Hot B", 3GPP TSG GERAN#35, GP-071264, (Aug. 2007).
Nokia Siemens Networks et al., "VoIP Over GERAN and FANR in the DL", 3GPP TSG-GERAN WG #35, Tdoc GP-071284, (Dublin, Ireland, Aug. 27-31, 2007).
Nokia Siemens Networks, "Time-based FANR clean-up and enhancements," 3GPP TSG GERAN WG2 #35bis, G2-070322 (Oct. 8-10, 2007).
Siemens, "Fast ACK/NACK reporting," GP-052634 (Nov. 7-11, 2005).
Telefon AB LM Ericsson et al., "MCS Design for Red Hot A", 3GPP TSG GERAN#35, Tdoc GP-071263, (Dublin, Ireland, Aug. 27-31, 2007).
Third Generation Partnership Project, "Technical Specification Group SGM/EDGE Radio Access Network; General Packet Radio Service (GPRS); Mobile Station (MS)—Base Station System (BSS) interface; Radio Link Control/Medium Access Control (RLC/MAC) protocol (Release 7)," 3GPP TS 44.060, V7.10.0, (Sep. 2009).
Third Generation Partnership Project, "Technical Specification Group SGM/EDGE Radio Access Network; General Packet Radio Service (GPRS); Mobile Station (MS)—Base Station System (BSS) interface; Radio Link Control/Medium Access Control (RLC/MAC) protocol (Release 7)", 3GPP TS 44.060, V7.14.0, (Sep. 2008).
Third Generation Partnership Project, "Technical Specification Group SGM/EDGE Radio Access Network; General Packet Radio Service (GPRS); Mobile Station (MS)—Base Station System (BSS) interface; Radio Link Control/Medium Access Control (RLC/MAC) protocol (Release 7)", 3GPP TS 44.060, V8.2.0, (Sep. 2008).
"Simultaneous support of PAN Indication and Polling Indicator," 3GPP TSG-GERAN#34, GP-070603 (May 14-18, 2007).
Huawei Technologies Co. Ltd, "Time-based Bitmap Generation and Interpretation," G2-070278, 3GPP TSG GERAN2 #35bis, Sophia Antipolis, France (Oct. 8-10, 2007).
Huawei Technologies Co. Ltd, "Modify the generation and interpretation of time-based Bitmap," G2-070279, 3GPP TSG-GERAN2 Meeting #35bis, Sophia Antipolis, France, (Sep. 8-10, 2007).
Motorola, "TR 25.820 3G Home NodeB Study Item Technical Report, version 0.1.0," R4-071083, TSG-RAN Working Group 4 (Radio) meeting #43 bis, Orlando, US (Jun. 25-29, 2007).
Nokia Siemens Networks, "Updates to TB-FANR," G2-070321, 3GPP TSG-GERAN WG2 Meeting #35bis, Sophia Antipolis, France (Oct. 8-10, 2007).
Nokia Siemens Networks, "Time-based FANR clean-up and enhancements," G2-070322, 3GPP TSG GERAN WG2 #35bis, Sophia Antipolis, France (Oct. 8-10, 2007).
Nokia Siemens Networks, "Updates to TB-FANR ," GP-071761, 3GPP TSG-GERAN Meeting #36, Vancouver, Canada (Nov. 12-16, 2007).
Nokia Siemens Networks, "Updates to TB-FANR," GP-080233, 3GPP TSG-GERAN Meeting #37, Seoul, South Korea (Feb. 18-22, 2008).
Nokia Siemens Networks, Nokia Corporation, "Updates to TB-FANR," G2-080218, 3GPP TSG-GERAN2 Meeting #37BIS, Sophia Antipolis, France (Mar. 3-Apr. 31, 2008).
Nokia Siemens Networks, Nokia Corporation, "Corrections to coding of time-based FANR PAN," G2-080219, 3GPP TSG-GERAN2 Meeting #37BIS, Sophia Antipolis, France (Mar. 3-Apr. 31, 2008).
Nokia Siemens Networks, Nokia Corporation, "Huffman Coding of Time-based FANR," GP-080706, GERAN#38, Malaga, Spain (May 12-16, 2008).
Nokia Siemens Networks, Nokia Corporation, "Updates to TB-FANR," GP-080707, 3GPP TSG-GERAN Meeting #38, Malaga, Spain (May 12-16, 2008).
Nokia Siemens Networks, Nokia Corporation, "Updates to TB-FANR," GP-080708, 3GPP TSG-GERAN Meeting #38, Malaga, Spain (May 12-16, 2008).
Technical Specification Group, Radio Access Network, "TS 25.322: Description of RLC protocol," TSGR#5(99)465, Meeting #5, Korea, (Oct. 1999).
Telefon AB LM Ericsson, "Bit swapping for RED HOT A PAN," GP-071952, 3GPP TSG GERAN #36, Vancouver, Canada (Nov. 12-16, 2007).
Third Generation Partnership Project, "Technical Specification Group Radio Access Networks; 3G Home NodeB Study Item Technical Report (Release 8)," 3GPP TR 25.820 V0.1.0 (Jun. 2007).
Third Generation Partnership Project, "Technical Specification Group Radio Access Networks; 3G Home NodeB Study Item Technical Report (Release 8)," 3GPP TR 25.820 V8.2.0 (Sep. 2008).
Third Generation Partnership Project, "Technical Specification Group GSM/EDGE Radio Access Network; General Packet Radio Service (GPRS); Overall description of the GPRS radio interface; Stage 2 (Release 7)," 3GPP TS 43.064 V7.6.0 (Aug. 2007).
Third Generation Partnership Project, "Technical Specification Group Core Network; Mobile Station—Serving GPRS Support Node (MS-SGSN); Logical Link Control (LLC) layer specification; (Release 7)," 3GPP TS 44.064 V7.2.0 (Sep. 2007).
Third Generation Partnership Project, "Technical Specification Group Core Network; Mobile Station—Serving GPRS Support Node (MS-SGSN); Logical Link Control (LLC) layer specification; (Release 7)," 3GPP TS 44.064 V7.3.0 (Mar. 2008).

(56) References Cited

OTHER PUBLICATIONS

Third Generation Partnership Project, "Technical Specification Group GSM/EDGE Radio Access Network; Flexible Layer One (FLO) (Release 7)," 3GPP TR 45.902 V7.0.0 (Aug. 2007).

* cited by examiner

FIG. 1
(PRIOR ART)

| RLC/MAC BLOCK | | |
|---|---|---|
| RLC/MAC HEADER | RLC DATA BLOCK 1 | RLC DATA BLOCK 2 (CONDITIONAL) | PAN (OPTIONAL) |

FIG. 2
(PRIOR ART)

| RLC/MAC BLOCK | | | | |
|---|---|---|---|---|
| RLC/MAC HEADER | RLC DATA BLOCK 1 | RLC DATA BLOCK 2 (CONDITIONAL) | RLC DATA BLOCK 3 (CONDITIONAL) | RLC DATA BLOCK 4 (CONDITIONAL) | PAN (OPTIONAL) |

…

METHOD AND APPARATUS FOR TIME-BASED FAST ACK/NACK RESPONSE OPERATION WITH ENHANCED GENERAL PACKET RADIO SERVICE 2 UPLINK

CROSS REFERENCE TO RELATED APPLICATIONS

This application claims the benefit of U.S. provisional application No. 60/976,701 filed Oct. 1, 2007, which is incorporated by reference as if fully set forth.

FIELD OF INVENTION

This application is related to wireless communications.

BACKGROUND

Global system for mobile communications (GSM) Release 7 (R7) introduces several features to improve throughput in the uplink (UL) and downlink (DL), as well as to reduce latency of transmissions.

Among these, GSM R7 will introduce enhanced general packet radio services-2 (EGPRS-2) to improve throughput for the DL and the UL. EGPRS-2 throughput improvements in the DL are known as the REDHOT feature, and improvements for the UL are known as the HUGE feature. EGPRS-2 DL and REDHOT are synonym. Similarly, EGPRS-2 UL and HUGE are synonym.

In addition to legacy enhanced general packet radio service (EGPRS) modulation and coding schemes (MCS) based on Gaussian minimum shift keying (GMSK) (MCS-1 through MCS-4) and 8 phase-shift keying (8PSK) modulations (MCS-5 through MCS-9), EGPRS-2 DL will use quadrature PSK (QPSK), 16 quadrature amplitude modulation (16QAM) and 32QAM modulations. Another technique for improved throughput is the use of Turbo coding (as opposed to convolutional coding with EGPRS). Furthermore, operation at higher symbol rate (1.2× symbol rate of legacy EGPRS) with EGPRS-2B DL (or, REDHOT-B) and EGPRS-2B UL (or, HUGE-B) is another improvement.

Latency Reduction (LATRED) is another feature provided by GSM/EDGE radio access network (GERAN) Release 7 (and beyond) to reduce transmission delays, increase data throughput, and to provide better quality-of-service (QoS). The LATRED feature comprises two techniques. The first LATRED technique is reduced transmission time interval (RTTI) mode of operation. The second LATRED technique is fast acknowledgement/non-acknowledgement (ACK/NACK) reporting (FANR) mode of operation.

Both the RTTI feature and the FANR feature can either work separately, or in conjunction with each other. Furthermore, both the RTTI feature and the FANR feature can be used in conjunction with the EGPRS modulation-and-coding schemes MCS-1 to MCS-9 (except for MCS-4 and MCS-9 where FANR mode of operation is not possible), or with the novel Release 7 and beyond EGPRS-2 modulation-and-coding schemes DAS-5 to DAS-12, DBS-5 to DBS-12, UAS-7 to UAS-11 and UBS-5 to UBS-12. Both the RTTI and the FANR modes of operation are also possible with other existing Release 7 GERAN evolution features, and other features beyond for (E)GPRS packet transmission, or methods based thereof, such as for example the Downlink Dual-Carrier (DLDC) feature or Downlink Advanced Receiver Performance (DARP) operation.

In the pre-Release 7 GSM/GPRS/EGPRS modes of operation, an ACK/NACK report is typically sent in explicit radio link control (RLC)/medium access control (MAC) protocol messages, also referred to as RLC/MAC control blocks. Examples for such explicit RLC/MAC protocol messages include packet downlink ACK/NACK or packet uplink ACK/NACK messages. The RLC/MAC control block is addressed to a certain radio resource, called a temporary block flow (TBF).

A TBF is a temporal connection between a mobile station and a network to support a uni-directional transfer of data. If supported by the mobile station and the network, more than one (1) TBF can be allocated to a mobile station. A TBF is temporary and maintained only for the duration of the data transfer. Each TBF is assigned a temporary flow identity (TFI) by the network. The TFI is unique among concurrent TBFs in each direction and is used instead of mobile station identity in the RLC/MAC layer. For example, in GPRS and EGPRS modes of operation, the same TFI is included in every RLC/MAC header belonging to a particular TBF in order to allow the intended receiver, (i.e., the wireless transmit/receive unit (WTRU) or network), to determine the addressee of a received radio block.

In order to reduce transmission latencies associated with the use of an entire RLC/MAC control block, another mode of ACK/NACK operation in GSM/(E)GPRS Release 7 has been incorporated, referred to as FANR mode of operation. The ACK/NACK report for a certain TBF is "piggybacked" onto an RLC/MAC data block by puncturing a number of bits from the channel-coded data portion of the radio block at no loss of data. This new field which is inserted, when needed, into the RLC/MAC data block and which carries the ACK/NACK report as part of the radio block is referred to as a piggybacked ACK/NACK (PAN) field. The insertion of PAN is possible, and can be configured separately, both for the DL and UL directions. The PAN field, when sent to a WTRU in the DL, carries ACKs or NACKs for data units or protocol data units (PDUs) previously sent by the WTRU in the UL direction, and vice versa. The presence or absence of the PAN field in a radio block is indicated by the RLC/MAC header, either by a bit or bit field setting, or by setting other code points depending on the RLC/MAC header type accordingly, and therefore depends on the EGPRS/EGPRS-2 modulation and coding scheme chosen for the transmission of the radio block. In the DL direction, the PAN field of an RLC/MAC data block may possibly be addressed to a WTRU that is not the intended receiver of the data units (or PDUs) in the radio block. Alternatively, the PAN field and the data units (or PDUs) of the radio block may be intended for the same WTRU. Both for DL and UL directions, the TBF to which the PAN field refers may possibly be different from the TBF corresponding to the data units (or PDUs) of the radio block, even if the receiver is the same physical unit (WTRU, or network).

The actual bit field(s) carrying the ACKs or NACKs in the PAN field may be encoded according to either one of two (2) different procedures: a starting sequence number (SSN)-based approach or a time-based (TB)-approach. For both SSN-based and TB FANR operation, the PAN field is in principle the same, but the encoding approach differs.

When the SSN-based ACK/NACK mode is used, the PAN field includes an SSN and a reported bitmap, which relates to a series of RLC/MAC data blocks starting from the SSN. The PAN field contains parameters that can point out what block sequence number (BSN) the bitmap corresponds to. A BSN is included in every RLC data block.

For the TB FANR, the PAN field bits simply comprise a bitmap where pairs of bits refer to the decoding status of one or two RLC data block(s) on a given packet data channel (PDCH) in a given preceding transmission time interval (TTI). The TB ACK/NACK mode is particularly suitable to real time services such as voice over IP (VoIP). When the time-based ACK/NACK mode is used, instead of referencing the ACK/NACK report to SSNs, the ACK/NACK report refers to previously received RLC/MAC data blocks sent and the RLC/MAC data PDU(s) contained therein by one or possibly more WTRU(s) in the UL as given by a known or induced timing relationship. The TB-PAN field includes a bitmap providing feedback information relative to the reception of previously received UL RLC/MAC blocks at the network side. As a function of the size of the bitmap in the PAN field, a certain number of previously received RLC/MAC blocks can be acknowledged. When received in the DL, a TB-PAN field can carry information pertaining to more than one WTRU. Because any WTRU can keep track of when it sent RLC/MAC blocks in the UL, it can unambiguously associate ACK/NACK status in the PAN bitmap with its own transmissions (and ignore those of other WTRUs), because the timing relationship is known and fixed.

The SSN-based FANR method is used to convey ACK/NACKs for the downlink TBFs. However, for the uplink TBFs, either the SSN-based or the TB FANR method may be used. The base station subsystem (BSS) configures the FANR ACK/NACK mode to acknowledge the uplink transmissions when FANR is activated. When the TB-FANR mode is configured, all uplink TBFs in use by the WTRU must operate in the time-based ACK/NACK mode.

In the Release 7 GSM/GPRS/EGPRS modes of operation in conjunction with FANR mode of operation, the pairs of bits in the bitmap are used to refer to one (1) or two (2) RLC data block(s), or PDUs. In the following, we refer to the data units contained in an RLC/MAC data block as RLC data blocks, even though PDUs can be used as a synonym. Four different code points (using two bits) are currently defined in the current third generation partnership project (3GPP) specification (TS 44.060 v.7.10.9 2007-9-25) as shown in Table 1.

TABLE 1

| Bit string | Meaning |
| --- | --- |
| 0 0 | failed header decoding |
| | header correctly received but failed decoding of the payload of the RLC data block (or RLC data blocks, in case of MCS-7/MCS-8/MCS-9) |
| 0 1 | header correctly received, failed decoding of the first RLC data block, correct decoding of the second RLC data block |
| 1 0 | header correctly received, correct decoding of the first RLC data block, failed decoding of the second RLC data block |
| 1 1 | correct decoding of the payload of the RLC data block, or correct decoding of both the first and second RLC data blocks |

In all four combinations given by prior art, the maximum number of RLC data blocks, or PDUs, that can be acknowledged is two (2). This is perfectly appropriate for FANR operation in conjunction with legacy enhanced general packet radio services (EGPRS), which at most can have two (2) RLC data blocks per TTI. In EGPRS, an RLC/MAC block using modulation and coding scheme (MCS)-1 to MCS-6 includes one RLC data block, and an RLC/MAC block using MCS-7 to MCS-9 includes two RLC data blocks, as shown in Table 2. FIG. 1 shows an RLC/MAC block for EGPRS data transfer with FANR activated. The RLC/MAC block comprises a combined RLC/MAC header, one or two RLC data blocks, and an optional PAN field.

TABLE 2

| Channel Coding Scheme | EGPRS RLC data unit size (N2) (octets) |
| --- | --- |
| MCS-1 | 22 |
| MCS-2 | 28 |
| MCS-3 | 37 |
| MCS-4 | 44 |
| MCS-5 | 56 |
| MCS-6 | 74 |
| MCS-7 | 2 × 56 |
| MCS-8 | 2 × 68 |
| MCS-9 | 2 × 74 |

However, the current baseline mode of operation with time-based FANR and its pair-wise bitmap definition of the PAN field does not allow for operation in conjunction with the EGPRS-2 UL (or, HUGE) features in Release 7 (R7). FIG. 2 shows an RLC/MAC block for EGPRS-2 data transfer. The RLC/MAC data block comprises a combined RLC/MAC header, one (1) up to four (4) RLC data blocks, and an optional PAN field which is included in case FANR is activated. Similarly, EGPRS-2 DL (or REDHOT) features in Release 7 (R7) use an RLC/MAC block containing more than the two (2) RLC data blocks.

EGPRS-2 UL Level A introduces five (5) new MCSs (UAS-7 to UAS-11) as shown in Table 3. An RLC/MAC block using UAS-10 and UAS-11 contains three (3) RLC data blocks. EGPRS-2 UL Level B introduces eight (8) new MCSs (UBS-5 to UBS-12) as shown in Table 4. An RLC/MAC block using UBS-9 and UBS-10 contains three (3) RLC data blocks, and an RLC/MAC data block using UBS-11 and UBS-12 contains four (4) RLC data blocks.

TABLE 3

| Channel Coding Scheme | EGPRS RLC data unit size (N2) (octets) |
| --- | --- |
| MCS-1 | 22 |
| MCS-2 | 28 |
| MCS-3 | 37 |
| MCS-4 | 44 |
| MCS-5 | 56 |
| MCS-6 | 74 |
| UAS-7 | 2 × 56 |
| UAS-8 | 2 × 64 |
| UAS-9 | 2 × 74 |
| UAS-10 | 3 × 56 |
| UAS-11 | 3 × 64 |

TABLE 4

| Channel Coding Scheme | EGPRS RLC data unit size (N2) (octets) |
| --- | --- |
| MCS-1 | 22 |
| MCS-2 | 28 |
| MCS-3 | 37 |
| MCS-4 | 44 |
| UBS-5 | 56 |
| UBS-6 | 74 |
| UBS-7 | 2 × 56 |
| UBS-8 | 2 × 74 |
| UBS-9 | 3 × 56 |
| UBS-10 | 3 × 74 |

TABLE 4-continued

| Channel Coding Scheme | EGPRS RLC data unit size (N2) (octets) |
|---|---|
| UBS-11 | 4 × 68 |
| UBS-12 | 4 × 74 |

EGPRS-2 UL (or, HUGE) has been carefully designed to operate in conjunction with the SSN-based FANR operation. While the SSN-based ACK/NACK mode may operate with EGPRs-2 UL (or HUGE) in the current state-of-the-art, the time-based ACK/NACK mode may currently not be employed in conjunction with EGPRS-2 transmission formats because of the prior art design assumption based on exclusive use only with EGPRS bursts. Therefore, no method has been provided for how a WTRU should deal with a configured time-based PAN field received in the DL when simultaneously using EGPRS-2 UL (or HUGE) transmissions in the UL. Similarly, no method has been provided for how a WTRU should deal with TB-FANR mode when using EGPRS-2 DL (or REDHOT) transmissions in the DL.

SUMMARY

A method and apparatus for time-based FANR operation with EGPRS-2 uplink (HUGE) are disclosed. A WTRU receives a configuration message and configures the downlink FANR operation and the EGPRS-2 mode uplink transmission not to be in conflict each other. If the time-based downlink FANR operation is configured, the EGPRS-2 UL mode may be blocked for uplink transmission. If the EGPRS-2 mode is configured for uplink transmission, an SSN-based downlink FANR operation may be configured. The WTRU may initiate an error handling procedure if both a EGPRS-2 mode uplink transmission and a time-based downlink FANR operation are configured by the configuration message. An MCS for the EGPRS-2 mode uplink transmission may be limited to an MCS containing at most two RLC data blocks. Three or more bits may be used in a PAN field for a time-based FANR operation if a EGPRS-2 mode uplink transmission is configured. Alternatively, at least one PAN bit may indicate an ACK or a NACK for a group of RLC data blocks. The number of bits used for a PAN field for a time-based FANR operation may be configured by the network. The downlink FANR operation may be dynamically switched between a time-based FANR operation and an SSN-based FANR operation in accordance with the configuration message.

BRIEF DESCRIPTION OF THE DRAWINGS

A more detailed understanding may be had from the following description, given by way of example in conjunction with the accompanying drawings wherein:

FIG. 1 shows an RLC/MAC block for EGPRS data transfer with FANR activated;

FIG. 2 shows an RLC/MAC block for EGPRS2 data transfer; and

DETAILED DESCRIPTION

Figure 3:
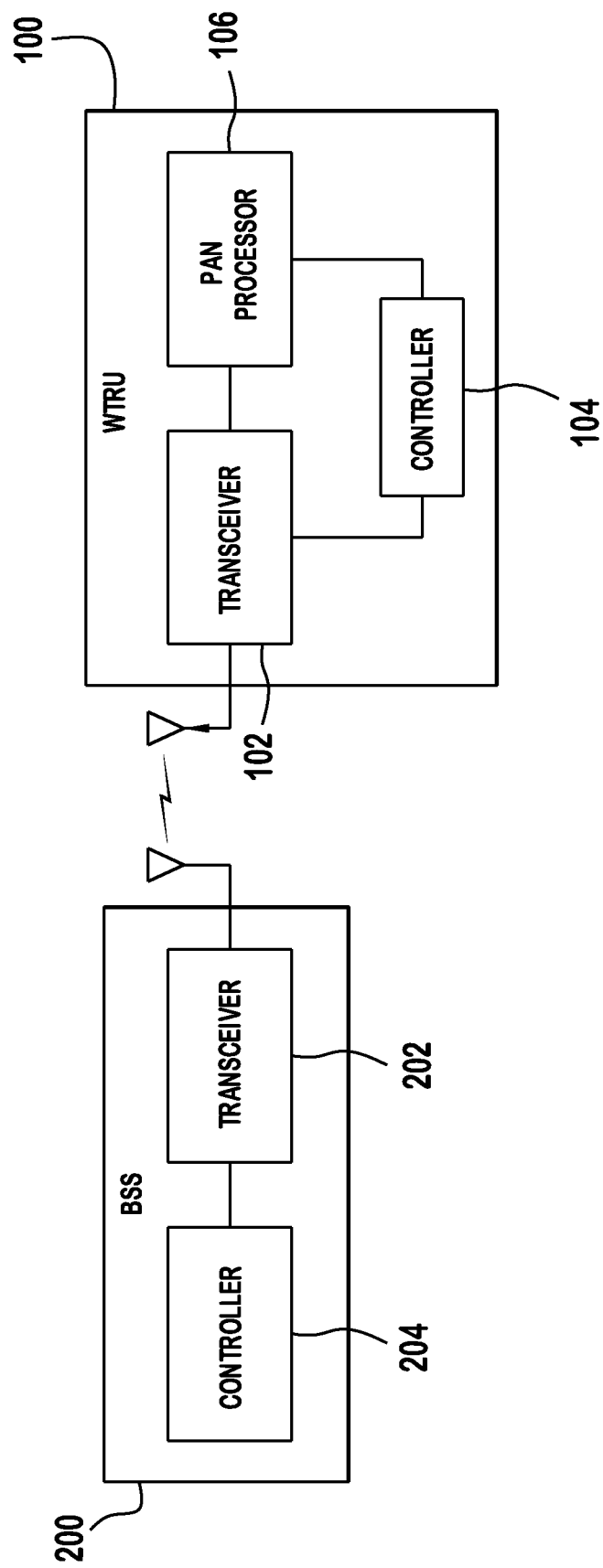
FIG. 3 shows an example WTRU and BSS.

When referred to hereafter, the terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

In accordance with a first embodiment, the time-based FANR operation may not be configured in conjunction with EGPRS-2 uplink transmissions by a WTRU. When the WTRU receives a configuration message with conflicting assignments, (i.e., time-based FANR operation to be performed in the downlink and using EGPRS-2 in the corresponding uplink transmissions), the WTRU generates an error condition and aborts operation or executes error handling procedures.

Alternatively, whenever a WTRU receives uplink assignments to operate in an EGPRS-2 mode, the WTRU assumes that the downlink FANR if simultaneously configured may only operate in an SSN-based mode. On the other hand, upon configuration of the time-based FANR operation in the downlink, the WTRU assumes that the WTRU may not use the EGPRS-2 mode in the uplink transmissions.

In accordance with a second embodiment, the current PAN field for time-based FANR operation is not changed, but simultaneous EGPRS-2 UL operation is limited to the MCSs containing not more than two RLC data blocks. For example, EGPRS-2 UL A operation is limited up to the maximum of UAS-9, and UAS-10 and UAS-11, which contain three RLC data blocks and may not be used whenever time-based FANR is activated. Similarly, EGPRS-2 UL B operation is limited to maximum UBS-8, and UBS-9 to UBS-11, which contain three or four RLC data blocks per TTI each, may not be used whenever time-based FANR is activated. Whenever a WTRU receives uplink assignments to operate in an EGPRS-2 mode, the WTRU assumes the maximum MCS to operate (part of legacy EGPRS or newly defined MCS).

One special case of the second embodiment is that the MCSs are limited to the legacy EGPRS MCSs, (i.e., MCS-1 to MCS-6 for EGPRS-2 UL Level A, and MCS-1 to MCS-4 for EGPRS-2 UL Level B), and new MCSs, (i.e., UAS-x or UBS-x) are not used when time-based FANR is activated for the WTRU.

In accordance with a third embodiment, time-based FANR may operate with the new EGPRS-2 UL Level A or B MCSs, and the time-based PAN is redefined to accommodate for the additional cases of three and/or four RLC data blocks per TTI when using EGPRS-2 UL Level A or B simultaneously. Instead of using two bits per TTI per EGPRS PDCH (i.e., timeslot), three or more bits are used in the case of a EGPRS-2 UL PDCH.

For example, if time-based PAN operation is extended to acknowledge status of three RLC data blocks in EGPRS-2 UL PDCHs, the code points in Table 4 may be used. It should be noted that Table 4 is provided as an example, and that different code points may be defined, and it may be extended to the case of four RLC data blocks per TTI per PDCH.

TABLE 4

| Bits | Meaning |
|---|---|
| 0 0 0 | Failed header decoding. Header correctly received but with a different downlink temporary flow identity (TFI). Header correctly received (with the correct downlink TFI) but failed decoding of the payload of the RLC block (or blocks). |

TABLE 4-continued

| Bits | Meaning |
|---|---|
| 0 0 1 | Header correctly received (with the correct downlink TFI), failed decoding of the first and second RLC data blocks, correct decoding of the third RLC data block |
| 0 1 0 | Header correctly received (with the correct downlink TFI), correct decoding of the second RLC data block, failed decoding of the first and third RLC data block |
| 0 1 1 | Header correctly received (with the correct downlink TFI), correct decoding of the second and third RLC data block, failed decoding of the first RLC data block |
| 1 0 0 | Header correctly received (with the correct downlink TFI), correct decoding of the first RLC data block, failed decoding of the second and third RLC data block |
| 1 0 1 | Header correctly received (with the correct downlink TFI), correct decoding of the first and third RLC data block, failed decoding of the second RLC data block |
| 1 1 0 | Header correctly received (with the correct downlink TFI), correct decoding of the first and second RLC data block, failed decoding of the third RLC data block |
| 1 1 1 | Correct decoding of the payload of the RLC block, or correct decoding of all the first, second and third RLC data blocks |

Instead of using a precisely defined number of M bits per TTI per PDCH, it is possible to address a chosen subset of relevant cases by compression of the bit map and other equivalent mapping rules. For example, the network may decide that it is adequate for acknowledging 2 out of 3 RLC/MAC blocks, which may be justified in a real-time application such as VoIP application, which may be more tolerant to packet losses. In an exemplary realization, adjacent code point pairs in Table 4, that is, (000 & 001), (010 & 011), (100 & 101), (110 & 111), may be combined, with appropriate change in the meaning of the compressed code-point-set and signaled by the network to the WTRU.

Similarly, a variable-length coding scheme may be used to associate codepoints in the PAN field with the expected probabilities of error occurrences, such as header decoding failings, missed or erroneously decoded RLC data blocks, etc.

In accordance with a fourth embodiment, the conventional operation of the time-based PAN field is not changed, (i.e., 2 bits per TTI are used), but more than one RLC/MAC data block per currently defined code point may be acknowledged positively or negatively.

For example, the code point {1, 0} in Table 1 currently indicates "header correctly received, correct decoding of the first RLC data block, failed decoding of the second RLC data block." In accordance with the fourth embodiment, the code point {1, 0}, for example, may indicate, in case of four RLC data blocks as with EGPRS-2 UL Level B, "header correctly received, correct decoding of the first and second RLC data blocks, but failed decoding of either the third or fourth RLC data block." In other words, each bit of the code point refers to either one or two RLC data blocks, depending upon the number of RLC data blocks sent in the previous TTIs, and therefore as a function of the EGRPS or the EGPRS-2 transmission mode used. For example, if three RLC data blocks were sent out in the previous TTI, the first bit of the code point may refer to the first and the second RLC data blocks and the second bit of the code point may refer to the third RLC data block. Similarly, if four RLC data blocks were sent out in the previous TTI, the first bit of the code point may refer to the first and second RLC radio blocks and the second bit of the code point may refer to the third and fourth RLC data blocks. In any case, if a certain bit of the code point refers to multiple RLC data blocks, the value of this particular code point bit (which may be 1 or 0) denotes that both the RLC radio blocks are correctly received (bit value 1) or both are received incorrectly (bit value 0).

The BSS makes an intelligent decision as to how best to report this information in the downlink. For example, if one of the radio blocks in a TTI was correctly received and the other was incorrectly received, the BSS may decide to report both the RLC data blocks as being correctly or incorrectly received since there is only one bit available for this reporting. Reporting both as being incorrectly received will increase the number of redundant retransmissions, whereas reporting both as being correctly received results in degraded data at the BSS (in case the BSS determines that the degradation is acceptable).

In accordance with a fifth embodiment, the time-based FANR PAN field operates in a flexible manner such that the BSS configures the WTRU to decode against a maximum number of RLC data blocks per TTI (therefore limiting the maximum EGPRS-2 UL MCS that can be used), but trades-off in terms of the number of TTIs/timeslots combinations that can be acknowledged. Each WTRU may be configured differently.

Increasing the number of code points to describe TTIs containing 3 or 4 RLC PDUs per transmission reduces the number of PDCHs per TTI and the number of previous TTIs that can be acknowledged. For example, with two bits per TTI which limit the maximum number of RLC data blocks per RLC/MAC block to two (2), a 20 bit PAN field may acknowledge up to 10 previous TTIs when one (1) timeslot is used per TTI by the WTRU, or to 5 previous TTIs when 2 timeslots are used per TTI by the WTRU, and so on. However, if 3 bits per TTI are necessary to indicate transmission status for new EGPRS-2 UL MCSs containing up to 3 RLC data blocks per RLC/MAC block, a 20 bit PAN field can only acknowledge up to 6 previous TTIs in case one (1) timeslot per TTI is used, or up to 3 previous TTIs in case two (2) timeslots per TTI is used, and so on.

In accordance with the fifth embodiment, the BSS signals to the WTRU that time-based FANR operation is enabled for certain uplink timeslots (as given in the timeslot bitmap of the configuration message), and that in the PAN configuration, two bits per TTI per PDCH are reserved. Therefore, the WTRU may not use UAS-10 or UAS-11 (or UBS-9 to UBS-11) which contain more than two RLC data blocks per TTI. On the other hand, up to 10 previous TTIs using a single timeslot, or up to 5 previous TTIs using 2 timeslots per frame may be acknowledged. Alternatively, the BSS may decide to signal to the WTRU that the PAN field uses 3 bits per TTI per PDCH. Therefore, the WTRU may use all EGPRS-2 UL Level A MCSs (which never contain more than 3 RLC data blocks in total), but not UBS-11 or UBS-12 with EGPRS-2 UL Level B (both of which contain 4 RLC radio blocks). However, a smaller number of previous TTIs/timeslots may be acknowledged by the BSS. The BSS may signal to the WTRU that the time-based PAN field operates using 4 bits per TTI per PDCH, allowing the WTRU to use all EGPRS-2 UL Level A and B MCSs.

In accordance with a sixth embodiment, the BSS commands WTRUs to change the mode between the time-based and SSN-based modes after initial TBF assignment. This may be achieved by the TBF-reassignment or TBF-modification messages. The BSS may decide to make a change based on any criteria including, but not limited to, channel conditions, network loading, etc. Since time-based and SSN-based FANR schemes have their own advantages and disadvantages, the performance may be optimized by dynamically switching the acknowledgement mode based on certain criteria.

In accordance with a seventh embodiment, a TFI-specific time-based FANR scheme is implemented. Under the current 3GPP specification, the time-based PAN field does not include a TBF identity. This scheme has a disadvantage that there has to be a strict mapping rule for the construction of the ACK/NACK bitmap. For example, the mapping becomes increasingly inefficient as the number of radio blocks per TTI increases to 4, where the bitmap may have to be partitioned into blocks of 4 bits.

A TBF to which the time-based PAN field is addressed is identified by a TFI. The TFI may be indicated in a number of different ways, explicitly or implicitly. For example, the TFI may be masked with the CRC bits of the PAN field bits or the entire payload. Such a TBF-specific time-based PAN field has an advantage that bitmap may comprise groups of 1-2-3-4 bits, each signifying the ACK/NACK bits of a 1-2-3-4 radio block per timeslot case, (i.e., different MCS schemes).

The embodiments disclosed above are applicable to EGPRS-2 UL Level C in Release 8.

FIG. 3 shows an example WTRU 100 and BSS 200. The WTRU 100 includes a transceiver 102, a controller 104, and a PAN processor 106. The controller 104 is adapted to receive a configuration message for a downlink FANR operation and an EGPRS-2 mode uplink transmission and configure the downlink FANR operation and the EGPRS-2 mode uplink transmission such that a time-based downlink FANR operation and the EGPRS-2 mode uplink transmission are not in conflict as disclosed above. The PAN processor 106 processes a PAN field for transmission and reception.

The controller 104 may block the EGPRS-2 mode for uplink transmission if a time-based downlink FANR operation is configured. The controller 104 may configure an SSN-based downlink FANR operation if an EGPRS-2 mode is configured for uplink transmission. The controller 104 may initiate an error handling procedure if both an EGPRS-2 mode uplink transmission and a time-based downlink FANR operation are configured by the configuration message.

The controller 104 may limit an MCS for the EGPRS-2 mode uplink transmission to an MCS containing at most two RLC data blocks. The controller 104 may configure the time-based downlink FANR such that at least three bits are used for a PAN field for the time-based downlink FANR operation if an EGPRS-2 mode uplink transmission is configured. The controller 104 may use two bits for a PAN field for a time-based FANR operation, and set at least one PAN bit to indicate an ACK or a NACK for a group of RLC/MAC data blocks. The configuration message may indicate a number of bits used for a PAN field for a time-based FANR operation. The controller 104 may dynamically switch the downlink FANR operation between a time-based FANR operation and an SSN-based FANR operation in accordance with a configuration message received from a network. The controller 104 may incorporate a TFI indicating a TBF to which the PAN is addressed within an RLC/MAC block.

The BSS 200 includes a transceiver 202 and a controller 204. The transceiver 202 transmits and receives RLC/MAC blocks to and from the WTRU 100. The controller 204 configures the downlink FANR operation.

Although features and elements are described above in particular combinations, each feature or element can be used alone without the other features and elements or in various combinations with or without other features and elements.

The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for performing, by a wireless transmit/receive unit (WTRU), time-based fast positive acknowledgement (ACK)/negative acknowledgement (NACK) response (FANR) operation, the method comprising:
    transmitting a radio block including a plurality of radio link control (RLC) data blocks; and
    receiving a radio block including a piggybacked ACK/NACK (PAN) field, wherein the PAN field comprises a variable number of bits, wherein both a quantity and a value of the variable number of bits is based on both a quantity of the plurality of RLC data blocks and a decoding status of the plurality of RLC data blocks, wherein the decoding status indicates header decoding failings and missed or erroneously decoded RLC data blocks of the plurality of RLC data blocks.

2. The method of claim 1 wherein the WTRU receives a first PAN field including a first number of bits in a first transmission time interval (TTI) and a second PAN field including a second number of bits in a second TTI.

3. The method of claim 2 wherein the first number of bits is different than the second number of bits.

4. The method of claim 1 wherein the PAN field indicates an ACK or a NACK for two RLC data block groups.

5. The method of claim 4 wherein each RLC data block group comprises up to two RLC data blocks.

6. A wireless transmit/receive unit (WTRU) for time-based fast positive acknowledgement (ACK)/negative acknowledgement (NACK) response (FANR) operation, the WTRU comprising:
    a transceiver configured to transmit a radio block including a plurality of radio link control (RLC) data blocks and receive a radio block including a piggybacked ACK/NACK (PAN) field, wherein the PAN field comprises a variable number of bits, where both a quantity and a value of the variable number of bits is based on both a quantity of the plurality of RLC data blocks and a decoding status of the plurality of RLC data blocks, wherein the decoding status indicates header decoding failings and missed or erroneously decoded RLC data blocks of the plurality of RLC data blocks; and a controller adapted to process the PAN field for the decoding status of the plurality of RLC data blocks.

7. The WTRU of claim 6 wherein the controller receives a first PAN field including a first number of bits in a first transmission time interval (TTI) and a second PAN field including a second number of bits in a second TTI.

8. The WTRU of claim 7 wherein the first number of bits is different than the second number of bits.

9. The WTRU of claim 6 wherein the PAN field indicates an ACK or a NACK for two RLC data block groups.

10. The WTRU of claim 9 wherein each RLC data block group comprises up to two RLC data blocks.

\* \* \* \* \*